United States Patent Office 3,322,691
Patented May 30, 1967

3,322,691
CATALYST PROCESS AND PRODUCT
William J. Craven, Passaic, N.J., assignor to W. R. Grace & Co., a corporation of Connecticut
No Drawing. Filed July 23, 1963, Ser. No. 296,941
4 Claims. (Cl. 252—458)

The present invention relates to a novel and useful process and product. More particularly, it relates to a process for improving catalyst activity and to the catalyst resulting from the process.

It is known in the art that various alpha-olefins may be polymerized by the use of a catalyst containing chromium on a silica or silica/alumina catalyst support. For example, in U.S. Patent 2,825,721, there is disclosed a process for the polymerization of alpha-olefins which employs such a catalyst and a solvent for the polymer so that the final polymer is obtained in a solution form. In U.S. Patent 2,949,447 a similar process is disclosed in which a non-solvent is employed in the reaction chamber with the catalyst and the polymer is obtained as discrete particles suspended in a slurry. In both processes, a constantly sought after objective is to increase the catalyst activity so that the grams of polymer/gram of catalyst/hour is increased thereby increasing production. Obviously, if catalyst activity can be increased by a simple change in the type of catalyst employed, it would be well received in the art.

It is an object of the present invention to provide a simple process for the formation of a catalyst. A further object is to provide a catalyst with improved activity. Another object is to provide a very simple and inexpensive process for the modification of a catalyst suitable for alpha-olefin polymerization. Other objects will become apparent as the description of the invention proceeds.

These objects are accomplished by the present invention which provides an improvement in the process for the formation of a catalyst containing chromium oxide on a silica base, the improvement comprising the addition of at least a portion of the chromium to the base as $CrO_2Cl_2$ and heating the said catalyst at a temperature of at least about 650° F. for at least about ½ hour to activate the catalyst.

In a preferred embodiment of the present invention, the catalyst is heated at a temperature of from about 800° F. to about 1700° F., more preferably from about 1050° F. to about 1550° F., for about ½ hour to about 30 hours. In actuality, a heating time of from about ½ hour to about 7 hours will accomplish the desired result. Further heating, while generally unnecessary, will not interfere with catalyst activity.

The present invention also provides the catalyst produced by the aforementioned improved process.

The expression "silica base" merely signifies a silica or silica alumina composite having a quite high surface area. Such "bases" are described in U.S. Patent 2,925,721. The chromyl chloride, $CrO_2Cl_2$, is generally added to the silica base by means of an inert liquid although other means may be used. Preferably, it is added to the base employing an anhydrous hydrocarbon, such as cyclohexane, with an inert atmosphere to prevent the premature conversion of the $CrO_2Cl_2$ to a chromium oxide prior to its contact with the catalyst base. Other inert liquids which may be used are heptane, octane, pentane, hexane, cyclopentane and the like. The inert atmosphere may be any gas which does not interfere with the process such as nitrogen, argon, neon and the like. The catalyst is then activated by heating in a stream of dry air.

In view of the fact that the chromyl chloride would normally be converted to chromic oxide in the heating step, one would expect the activity of the catalyst to be substantially the same as a catalyst employing chromic oxide per se. However, the activity is definitely not the same, for in some instances the catalyst activity is essentially doubled. While the applicant does not wish to be bound by any theory concerning the reaction, it is believed that the chromium when added as chromyl chloride becomes intimately attached to the catalyst base as a chromium oxide according to the following reaction:

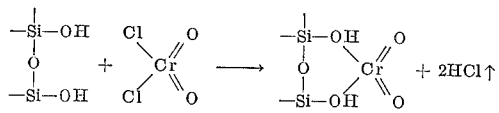

If such be the case, the difference in activity is probably due to the particular bonding of the chromium oxide to the catalyst base. In any event, the use of chromyl chloride in the preparation of such a catalyst unexpectedly improves the activity of the catalyst as is hereinafter demonstrated.

The following examples are given to illustrate the invention and are not intended to limit it in any manner. All percentages are given on a weight basis unless otherwise indicated.

In Examples 1, 2, 7 and 8 and Controls A, B, E and F, the catalyst base has the following characteristics; pore volume 0.90 cc./gm., surface area 580 sq. m./gm., average pore diameter 62 A., total volatile 10.0 wt. percent—1750° F., bulk density 35 lb./cu. ft. and average particle size 54 to 65 microns.

In Examples 3 to 6 and Controls C and D, the catalyst base has the following characteristics; pore volume 0.75 cc./gm., surface area 550 sq. m./gm., average pore diameter 55 A., total volatile 12 max. wt. percent—1750° F., bulk density 31 lb./cu. ft. and mesh size through 250.

In Examples 9 and 10 and Control G, the catalyst base has the following characteristics; pore volume 1.16 cc./gm., surface area 340 sq. m./gm., average pore diameter 140 A., total volatile 4.5 wt. percent—1750° F., bulk density 27 lb./cu. ft. and mesh size 3 to 10.

The "High Load Melt Index" (HLMI) given in the table is measured according to the standard ASTM-D-1238–59T test with the exception that a 21,600 gram weight is employed instead of the standard 2,160 gram weight.

The "Catalyst Activity" is given in grams of polymer/gram of catalyst/hour. The percentages given in the table for the $CrO_3$ are based on the total weight of the catalyst and it is assumed for calculation purposes that all chromium added as $CrO_2Cl_2$ is in the form of $CrO_3$ (to give a direct weight comparison with the conventional $CrO_3$).

EXAMPLES 1 TO 10

Preparation of catalyst

To prepare the catalyst, 40 grams of the catalyst base are placed in a vessel equipped with a stirrer and 300 ml. of freshly distilled anhydrous cyclohexane are added. The stirred mix is maintained in an atmosphere of nitrogen and 1.24 grams (0.65 cc.) of chromyl chloride is added from a syringe. The mix is stirred vigorously in the inert atmosphere for 10 minutes and allowed to settle so that the clear supernatant liquid can be readily decanted. Upon removal of the liquid, the catalyst which is now red-brown in color is dried in a vacuum oven and then activated for 6 hours at 1200° F. in a stream of dry air.

When fluoride is added to the catalyst, the solvent is removed and the fluoride is added as $(NH_4)_2SiF_6$ to the dried catalyst as a solid, mixed well and the mix activated as described above.

For the Control Runs, the chromium oxide ($CrO_3$) is added to the catalyst base by the use of water as described in U.S. Patent 2,825,929. The catalyst is activated for 6 hours at 1200° F. in a stream of dry air.

When fluoride is added to this catalyst, it is added with the chromic oxide as described in the aforementioned patent.

Preparation of polymer 0.25 gram of the activated catalyst is added to a 1 liter stainless steel reactor which is maintained with an inert nitrogen atmosphere. 550 ml. of cyclohexane is added to the reactor. The closed system is heated to the temperature indicated in the table and ethylene is added at a flow of 5 grams/minute until the reactor pressure is 450 p.s.i.g. Ethylene is continuously added as consumed for 1 hour. The polyethylene is recovered and dried.

The results of the examples and Control Runs are given in the following table.

TABLE

| Example | Catalyst Base | | Percent $CrO_3$ Added as $CrO_3$ | Percent $CrO_3$ Added as $CrO_2Cl_2$ | Percent F Added as $(NH_4)_2SiF_6$ | Polymerization Temp., °F. | Polymer HLMI | Activity (g./g./hr.) |
|---|---|---|---|---|---|---|---|---|
| | Silica, percent | Alumina, percent | | | | | | |
| Control A | 99.9 | 0.1 | 2.0 | | | 208 | 0.12 | 267 |
| Ex. 1 | (1) | (1) | | 2.0 | | 208 | 0.17 | 521 |
| Control B | 99.9 | 0.1 | 2.0 | | | 198 | 0.06 | 183 |
| Ex. 2 | (1) | (1) | | 2.0 | | 198 | 0.08 | 541 |
| Control C | 87.0 | 13.0 | 2.0 | | 0.4 | 208 | 0.88 | 438 |
| Ex. 3 | (1) | (1) | | 2.0 | 0.4 | 208 | 0.19 | 668 |
| Control D | 87.0 | 13.0 | 2.0 | | 0.4 | 214 | 1.2 | 500 |
| Ex. 4 | (1) | (1) | | 2.0 | 0.4 | 215 | 0.37 | 750 |
| Ex. 5 | (1) | (1) | | 2.0 | | 208 | 0.22 | 670 |
| Ex. 6 | (1) | (1) | | 2.0 | | 215 | 0.54 | 682 |
| Control E | 99.9 | 0.1 | 2.0 | | 1.0 | 208 | 0.09 | 120 |
| Ex. 7 | (1) | (1) | | 2.0 | 1.0 | 208 | 0.18 | 522 |
| Control F | 99.9 | 0.1 | 2.0 | | 1.0 | 194 | 0.04 | 198 |
| Ex. 8 | (1) | (1) | | 2.0 | 1.0 | 198 | 0.10 | 448 |
| Control G | 100.0 | | 2.0 | | | 208 | 1.07 | 304 |
| Ex. 9 | (1) | (1) | | 2.0 | | 208 | 1.22 | 413 |
| Ex. 10 | (1) | (1) | | 2.0 | | 215 | 2.10 | 507 |

1 Same as above.

While in the above examples, an activation temperature of 1200° F. is employed in every case, it is to be understood that the activation temperature is held constant so as to give a comparative measure of the catalyst activity. Obviously, higher or lower temperatures may be used as herein described. Similarly, while sufficient chromyl chloride is employed in each example so as to give 2% by weight of chromium oxide in the catalyst, it is obvious that the percent added may be varied as desired.

The catalyst produced in accordance with the present invention may be used for any reaction where a chromium oxide catalyst is conventionally employed. It is particularly applicable for the polymerization of ethylene, propylene and other alpha-olefins as described in U.S. Patents 2,825,721, 2,949,447 and others.

Many equivalent modifications will be apparent to those skilled in the art from a reading of the foregoing without a departure from the inventive concept.

What is claimed:

1. In the process for the formation of a catalyst containing chromium oxide on a silica base, the improvement which comprises the addition of at least a portion of the chromium oxide to the base as $CrO_2Cl_2$ and heating the said catalyst at a temperature of at least about 650° F. for at least about ½ hour to activate the catalyst.

2. In the process for the formation of a catalyst containing chromium oxide on a silica base, the improvement which comprises the addition of at least a portion of the chromium oxide to the base as $CrO_2Cl_2$ and heating the said catalyst at a temperature from about 800° F. to about 1700° F. for about ½ hour to about 30 hours to activate the catalyst.

3. In the process for the formation of a catalyst containing chromium oxide on a silica base, the improvement which comprises the addition of at least a portion of the chromium oxide to the base as $CrO_2Cl_2$ and heating the said catalyst at a temperature from about 1050° F. to about 1550° F. for about ½ hour to about 7 hours to activate the catalyst.

4. A catalyst containing chromium oxide on a silica base which is produced by the addition of at least a portion of the chromium oxide to the base as $CrO_2Cl_2$ and heating the catalyst at a temperature of at least about 650° F. for at least about ½ hour to activate the catalyst.

References Cited

UNITED STATES PATENTS 3,216,982  11/1965  Orzechowski et al. ___ 260—88.2

DANIEL E. WYMAN, *Primary Examiner.*

OSCAR R. VERTIZ, *Examiner.*

E. J. MEROS, C. F. DEES, *Assistant Examiners.*